M. MORITA
S. ITO
Inventors

By C. K. Suydam
AGENT

Dec. 18, 1962 MASASUKE MORITA ET AL 3,069,625

RECEPTION SYSTEM OF HIGH SENSITIVITY FOR FREQUENCY- OR PHASE-MODULATED WAVE

Filed March 12, 1959 2 Sheets-Sheet 2

M. MORITA
S. ITO
Inventors

By C. H. Suydam
AGENT

United States Patent Office 3,069,625

Patented Dec. 18, 1962

3,069,625

RECEPTION SYSTEM OF HIGH SENSITIVITY FOR FREQUENCY- OR PHASE-MODULATED WAVE

Masasuke Morita and Sukehiro Ito, Tokyo, Japan, assignors to Nippon Electric Company, Limited, Tokyo, Japan, a corporation of Japan Filed Mar. 12, 1959, Ser. No. 798,960
Claims priority, application Japan Mar. 20, 1958
3 Claims. (Cl. 325—349)

This invention relates to radio receivers for frequency modulated waves. Specifically, the invention relates to improvements in such receivers which enables them to receive frequency modulated signal waves having field strengths much lower than the field strengths or ambient noise received simultaneously with the signal waves.

Accordingly, this invention is considered to embrace the following objects:

To reduce the threshold level of FM receivers in the presence of excessive noise.

To reduce the threshold level of FM receivers to a value such that the signal-to-noise ratio is not deteriorated abruptly when the amplitude of noise or other interference waves exceed the amplitude of the FM waves to be received.

The above-mentioned and other features and objects of the invention and the manner of attaining them will become more apparent and the invention itself will be best understood by reference to the following description of an embodiment of the invention taken in conjunction with the accompanying drawings wherein.

To design present-day FM receivers applicable to radio communication circuitry so as to perform stabilized communication service with a favorable value of the signal-to-noise ratio and a high sensitivity even at a sufficiently small reception input power brings about numerous advantages such as, for instance, an increase in communicable range, more reliability, reduction in transmission output, etc. The importance has been much more enhanced recently with the discovery of the propagation of radio waves in the VHF and UHF regions beyond the horizon.

This invention intends, with FM or PM receivers, to demodulate by use of a local oscillator voltage which is synchronized with the carrier contained in the reception signal and whose amplitude is larger than that of the reception signal so that the operation of demodulation may be prevented from being interfered with by noise at a sufficiently small reception input power, and further to improve the signal-to-noise ratio and the distortion factor with negative feedback for the frequency-modulated wave by applying modulation to the local oscillator with the demodulated output signal, so that communication may be secured with an optimum channel signal-to-noise ratio at a sufficiently small reception input power through the above-mentioned two operations.

The detail of the operation will now be given in conjunction with the attached drawings. Although the different terms "frequency modulation" and "phase modulation" are used hereafter, the two systems of modulation are essentially the same and may be dealt with by the same mathematical expressions in analysis. In the following description, either of these terms may be used at times, for convenience sake, but it will be understood that the situation is by no means restricted to that type of modulation only, but is equally applicable to both types of modulation.

Figure 1:
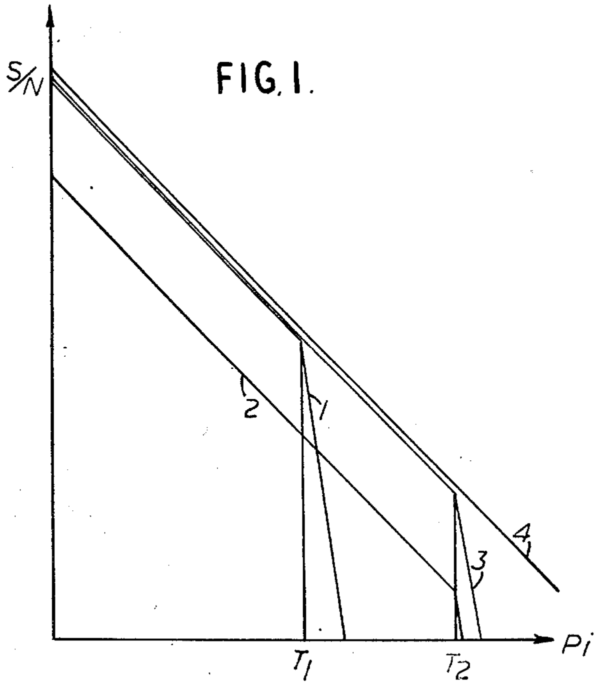
FIG. 1 shows the relations between the reception input power and the channel signal-to-noise ratio of a receiver operated on the FM or PM system.

FIG. 1 shows the characteristic curves illustrating the effect of the FM or PM reception system of high sensitivity in accordance with the present invention. In this figure $P_i$ denotes receiver input power, the right-hand direction being that in which power is weakened while the ordinate $S/N$ denotes the channel signal-to-noise ratio. In the figure, 1 denotes the characteristic curve for a wide-band receiver for frequency-modulated current that has been commonly used. It will be evident from the drawing that while the reception input power is comparatively large the channel signal-to-noise ratio varies in proportion to said reception input power, but as soon as the power becomes less than the threshold power indicated by $T_1$ in the figure, the signal-to-noise ratio rapidly deteriorates, resulting in a failure of communication.

This phenomenon is due to the fact that the operation of an amplitude limiter used for demodulation is interfered with by noise.

If the frequency bandwidth is narrowed to increase the sensitivity of the receiver, it is true that the threshold level may be improved from $T_1$ to $T_2$ as is shown by the characteristic curve (2), but this will necessitate the lessening of the amount of frequency deviation in the transmitted frequency-modulated wave in order to prevent an excess increase in distortion, which in turn, will sacrifice the channel signal-to-noise ratio where the reception input power is large.

To solve this contradication, a method of decreasing the bandwidth of an intermediate-frequency amplifier with FM negative feedback may be adopted by applying the demodulator output to the local oscillator to cause it to be frequency-modulated. In this case, the threshold level may be improved appreciably without degrading the channel signal-to-noise ratio where reception input power is sufficiently large as is shown by curve (3) in the figure. From the viewpoint of stability of the negative feedback circuit, however, there exists a certain limitation in the construction of circuitry between the amount of negative feedback and the bandwidth of the intermediate-frequency amplifier, with the result that an improvement to a large extent cannot be obtained.

With the present invention, however, as will be described in detail elsewhere, the demodulation operation is performed by use of a local oscillator voltage which is synchronized with the carrier contained in the reception signal and whose amplitude is considerably larger than that of the reception signal, whereby the succeeding operations are prevented from being interfered with by noise. Consequently the threshold power which would otherwise frustrate communication at a weaker reception input power level beyond said threshold will no longer be present by use of a system in accordance with this invention.

Further, with the present invention, negative feedback for frequency-modulated current is performed by frequency-modulating the local oscillator with the demodulated output signal. As a result, as is shown by the characteristic curve (4) in FIG. 1, the channel signal-to-noise ratio where the reception input power is large may be favorably maintained, and fully stabilized communication with an optimum signal-to-noise ratio at extremely weak electric field intensities may be performed with an optimum value of the signal-to-noise ratio where the reception input power is large while preventing an abrupt degradation in the signal-to-noise ratio even if the reception input power is weakened. As will be evident from the drawing, it is of great practical merit.

Figure 2:
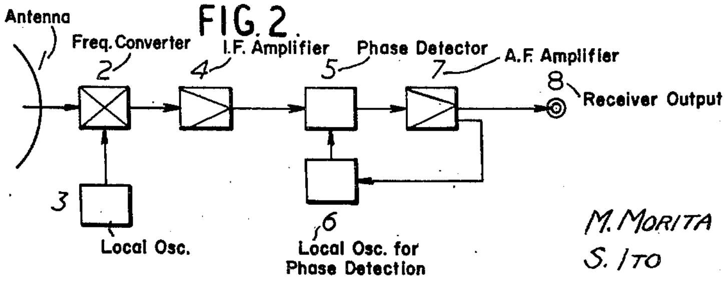
FIG. 2 shows a schematic block diagram for an embodiment of the FM or PM high-sensitivity reception system in accordance with this invention.

FIG. 2 shows a block diagram illustrating an embodiment of the receiver for frequency- or phase-modulated current in accordance with the present invention, in which

1 denotes the receiving antenna, 2 frequency converter, 3 local oscillator, 4 intermediate-frequency amplifier, 5 phase detector, 6 local oscillator for phase detection, 7 audio-frequency amplifier, and 8 denotes the receiver output terminal.

The frequency-modulated current from the antenna 1 is converted into a suitable intermediate frequency by the frequency converter 2 with the local oscillator frequency available from the local oscillator 3, and then the output is amplified sufficiently through the intermediate-frequency amplifier 4. Thereafter, the intermediate-frequency signal is demodulated by the phase detector 5 with the method of phase detection by the use of an output from the local oscillator 6 for phase detection without its operation being interfered with by noise.

Figures 3, 4:
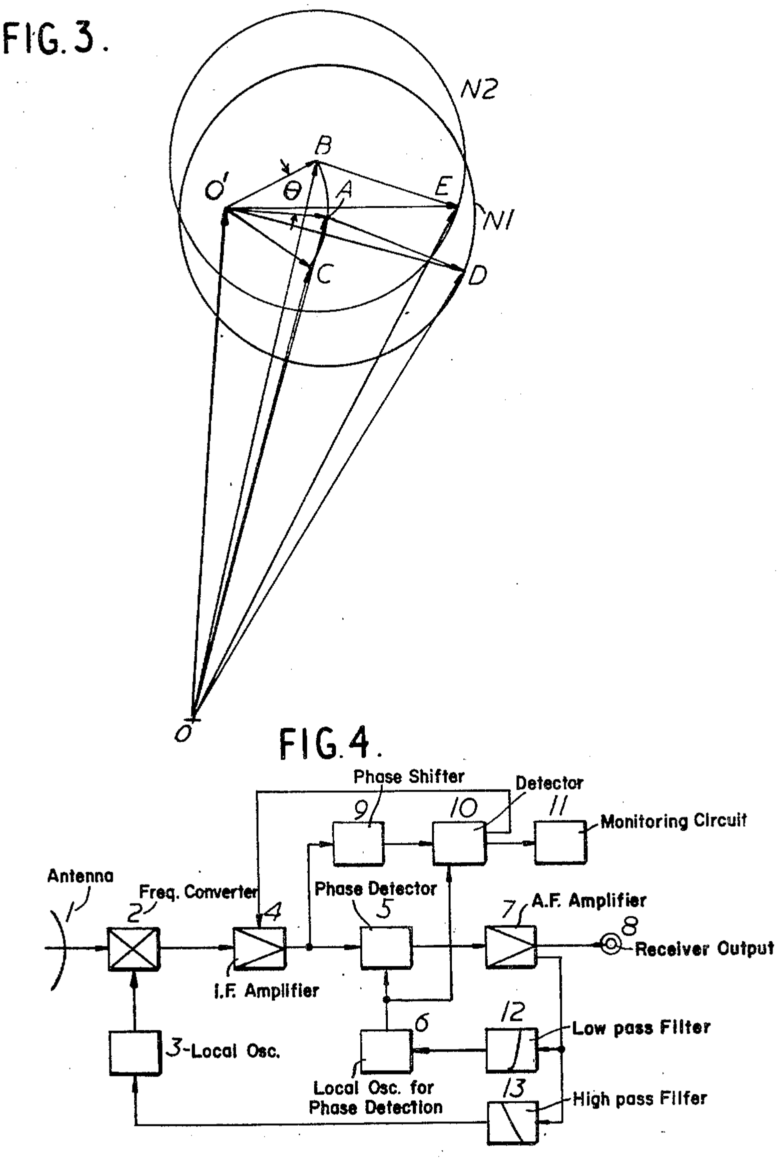
FIG. 3 shows a vector diagram illustrating the operation of demodulation for a phase detector in the example of FIG. 2.
FIG. 4 shows a block diagram for another embodiment of the present invention.

FIG. 3 shows a vector diagram illustrating the operation of demodulation at the phase detector in FIG. 2. It will also serve to illustrate that this phase detector can operate under normal conditions of demodulating operation even if, with the conventional receivers employing an amplitude limiter and a frequency discriminator, communication becomes impossible on account of a decrease in reception input power beyond the threshold power.

In FIG. 3, the vector OO′ represents an output voltage of the local oscillator for phase detection use indicated by 6 in FIG. 2 while O′A represents a signal voltage from the intermediate-frequency amplifier shown by 4 in FIG. 2. These two voltages will be composed so as to be in quadrature with each other at the phase detector 5 shown in FIG. 2 to produce the resultant vector OA shown in the figure. The operation of demodulation is performed by detecting the amplitude of the resultant vector.

In the first place, consider a case in which the vector OO′ which represents an output of the local oscillator for phase detection undergoes no modulation and the vector O′A only which represents the reception signal which undergoes phase variation of plus or minus $\theta$ in the absence of noise. Then the reception signal vector is represented by O′A or O′B or O′C shown in FIG. 3, a vector with the origin at O′ and the tip traveling on the arc BAC. Accordingly, the resultant vector for the local oscillator output for phase detection and the reception signal becomes a vector having the origin at O and the tip traveling back and forth along the arc BAC. Therefore, the demodulated output available by detecting the amplitude of this resultant voltage will vary with variation in phase of the reception signal so that phase detection is performed.

In the second place, let the case in which both the output of the local oscillator for phase detection and the reception signal vary in phase be considered. In this case, as far as the relative phase difference remains between plus and minus $\theta$, phase detection will be performed in the same manner as in the above-mentioned case (wherein the output voltage of the local oscillator for phase detection did not undergo phase variation) the demodulated output responding to the relative phase difference between the two being obtained no matter how each of them varies in phase. However, as will be evident from the vector diagram of FIG. 3 when the amplitude of the output of the local oscillator for phase detection is considerably larger than that of the reception signal and when the relative difference between the instantaneous phase of the vector OO′ representing the output of the local oscillator for phase detection 6 and that of the reception signal, vector O′A becomes approximately an integral multiple of $\pi$ radians, the demodulated output amplitude variation compared with the relative phase difference will be minimized. For example, when the phase difference between vectors OO′ and O′A is approximately zero, 180°, or a multiple of the latter, the magnitude of their vector sum, vector OA remains substantially constant for considerable variations in their relative phase. Thus in order to prevent excessive distortion, and to provide for practical linearity of the demodulator, the range of the relative phase difference between vector OO′ and O′A should be restricted to approximately $\pm 1$ radian when the difference in the average phase is maintained at an angle of 90 degrees.

Now, suppose that the reception input power becomes small and the reception signal becomes smaller than the noise in the output of the intermediate-frequency amplifier indicated by 4 in FIG. 2. In this case, the phase detector operates as follows:

In FIG. 3, when the reception signal is represented by a vector O′A, the phase of the noise changes in various ways irrespective of its relation with the phase of the reception signal. Since its amplitude is larger than that of the reception signal, the vector representing the noise will have its origin at A, the tip on the circumference $N_1$, and the radius AD which is larger than O′A. Inasmuch as the intermediate-frequency output voltage is the addition of the reception signal and the noise voltages, it will be represented by a vector O′D with its origin at O′ and its tip on the circumference $N_1$ as shown in FIG. 3. The resultant of the local oscillator for phase detection output voltage OO′ and the intermediate-frequency voltage O′D which is composed in the phase detector will then be represented by a vector OD with the origin at O and the tip on the circumference $N_1$. What is available by detecting this amplitude is the demodulated output.

As will be apparent from the foregoing description as well as from FIG. 3, insofar as the output voltage of the local oscillator for phase detection is sufficiently large, and provided the reception signal input power is also sufficiently large, the demodulated output from which the vector component due to the noise is deducted will be equal to the demodulated output which is substantially free from the noise, or that which is produced by detection of the amplitude OA in FIG. 3. If the phase of the reception signal is varied and represented by O′B in FIG. 3, the resultant voltage produced in the phase detector will be represented by a vector with the center at O and the tip on the circumference $N_2$ of a circle having the center at B and the same radius as $N_1$. As a result, the demodulated output available by detecting its amplitude from which the vector component due to the noise is deducted will again be equal to the demodulated output substantially free from the noise.

Under the above assumed conditions the noise can never completely suppress the reception signal since the vector representing the vector sum of the voltage of the local oscillator for phase detection, the reception signal voltage and the instantaneous noise voltage never can rotate completely around the voltage vector of the local oscillator for phase detection. The larger the voltage of the local oscillator for phase detection, the smaller will be the maximum phase angle through which the two voltages oscillate. Only when the voltage of the local oscillator for phase detection is less than the algebraic sum of reception signal and noise voltages can the maximum phase angle exceed 360° or any multiple thereof and thereby completely suppress the signal.

It will be further apparent from the above explanation that substantially linear detection will be obtained if the amplitude of the local oscillator for phase detection is sufficiently large. Due to this linearity there will be substantially no intermodulation between the signal and the noise components as well as between the noise components themselves. It will, therefore, be possible to obtain by suitable filtering a detected signal substantially free from the noise power contained outside of the signal band.

As has been mentioned, the phase detector will be able to demodulate the signal under normal operating conditions without being completely suppressed by noise even if communication would fail with a conventional receiver having an amplitude limiter and a frequency discriminator as the reception input power becomes weak and the magnitude of signal prior to entering the demodulator becomes smaller than that of noise.

Referring to FIG. 2 again, the demodulated output thus obtained will be amplified by the low-frequency amplifier 7 and will be transmitted to the receiver output terminal 8 as the reception signal. On the other hand, a part of this demodulated output will be applied to the local oscillator 6 for phase detection to cause the oscillation frequency to be frequency- or phase-modulated so as to follow up the variation in frequency or phase of the reception signal. As has been fully described previously, the demodulated output of the phase detector 5 is determined by the relative phase difference between the reception signal from the I.-F. amplifier 4 and the output of the local oscillator 6 for phase detection no matter how their instantaneous phase values may change, thereby constituting a negative feedback circuit.

As has been described previously, the range within which the phase detector 5 can perform demodulation which is substantially free from distortion is restricted to about $\pm 1$ radian, the maximum value for the phase deviation in the reception signal must be held below $\pm 1$ radian from the point of view of distortion, with the result that a sufficient value of the channel signal-to-noise ratio is not available. Where negative feedback is combined with the above-mentioned method of phase detection, however, the phase of the output of the local oscillator 6 for phase detection will also vary, following the phase deviation in the reception signal. By providing sufficient negative feedback the maximum phase deviation of the transmitted signal can be made as large as desired, yet the maximum phase difference between the phase of the reception signal and the phase of the local oscillator for phase detection can still be limited to approximately $\pm 1$ radian, the limiting values for linearity. Therefore a favorable value of the channel signal-to-noise ratio may be secured even at an extremely weak reception power. Furthermore, since such FM negative feedback is possessed of a function of improving the distortion produced in the negative feedback circuit in the same manner as in a general low-frequency amplifier, the distortion produced in the phase detector will be improved to a great extent.

Although an explanation of the method of operation of the phase detector shown in FIG. 3 has been given referring to a case in which the intermediate-frequency amplifier output is not divided, another method may also be resorted to by dividing said output into two parts. According to this second method, the I.-F. amplifier output voltage is divided into two parts of equal amplitude, but of opposite phase, to each of which a voltage from the local oscillator for phase detection is added. The amplitudes of two resultant voltages are then detected, and the outputs are differentially combined to obtain the demodulated output. With this method, the demodulated output can be made zero when the reception signal voltage from the I.-F. amplifier and the voltage from the local oscillator for phase detection are in quadrature. As a result, the D.C. component in the demodulated output not only becomes zero when the difference in average value of both phases is 90 degrees, but also indicates the polarity responding to the direction in which the difference is shifted from 90 degrees and the magnitude responding to the amount of shift. If, with this voltage, automatic control is performed in such a manner that the oscillation frequency of the local oscillator for phase detection may be varied, the operating point of the phase detector can be held at a point at which the amount of distortion is minimized.

FIG. 4 shows a block diagram for another example of the FM or PM high-sensitivity receiver in accordance with the present invention, in which numerals 1 through 8 show the identical parts as shown by the corresponding numerals in FIG. 2, while 9 denotes a phase shifter, 10 detector, 11 monitoring circuit, 12 and 13 denote the low-pass and high-pass filters respectively.

The signal current received by the antenna 1 is converted into a suitable intermediate frequency at the frequency converter 2 by the local oscillator frequency from the local oscillator 3, the intermediate-frequency is amplified by amplifier 4, and the amplified output, after being demodulated by the phase detector 5 with an output of the oscillator for phase detection, is transmitted to the receiver output terminal via the low-frequency amplifier 7. This is the same sequence as has been fully described referring to the receiver shown in FIG. 2. Differing from the receiver shown in FIG. 2, however, part of the demodulated output signal is separated into two components by means of a low-pass filter 12 and a high-pass filter 13, the low frequency component containing direct current and the high frequency component containing mainly the signal component.

The former, or the low-frequency component representative of possible frequency drift of the carrier frequency or local oscillator frequencies and also containing the direct current component, is applied to the local oscillator 6 for phase detection to enable the oscillation frequency to be stabilized against frequency drift and the phase detector 5 to perform automatic control in such a manner that the phase detector 5 operates with minimum distortion at all times.

On the other hand, the high-frequency component containing the signal is applied by negative feedback to the local oscillator 3 to cause it to be frequency- or phase-modulated so that the oscillation frequency of the local oscillator 3 may follow the frequency deviation in the reception signal. Thus the frequency deviation in the I.-F. signal produced through frequency conversion is available as a difference in frequency deviation between the reception signal and the local oscillator frequency. The frequency deviation at the I.-F. frequency is so compressed by negative feedback that it is extremely small as compared to that of the high frequency of the reception signal—that is, the frequency deviation in the transmitter from which the radio wave is transmitted. Therefore, even if the maximum phase deviation at the I.-F. is so restricted that no excessive distortion may be produced in the phase detector 5, the frequency deviation in said transmitter may be taken sufficiently large.

Consequently, by use of a sufficiently large local oscillator voltage for phase detection, the operation of the phase detector 5 will not be interfered with noise even if the reception input voltage is extremely weakened. In addition, just as in the receiver whose block diagram is shown in FIG. 2, the channel signal-to-noise ratio when the reception input power is large may be maintained at a favorable value while it will not be deteriorated abruptly even if said power is weakened. Fully stabilized communication with a favorable value of the signal-to-noise ratio will thus be ensured.

A similar effect may be obtained by applying both the low-frequency component containing direct current which is a part of the demodulated output signal and the high-frequency component containing the signal component to the local oscillator 3 to cause the oscillation frequency to vary so that the local oscillator 3 may perform not only FM negative feedback for the signal, but also automatic phase control for maintaining the operation of the phase detector 5 at minimum distortion.

Exactly the same effect will be available by applying the low-frequency component containing direct current from the low-pass filter 12 to the local oscillator 3 to cause it to perform automatic phase control and by applying the high-frequency component containing the signal component from the high-pass filter 13 to the local oscillator for phase detection to cause it to perform FM negative feedback.

In FIG. 4, part of the reception signal from the intermediate-frequency amplifier 4 will pass through the phase shifter 9 and undergo a phase variation of 90 degrees before it enters into the detector 10. The circuit of the detector 10 is exactly the same as that of the phase detector 5. For example, the output voltage of the local oscillator 6 for phase detection is furnished in a similar way and its operation is the same as what has been described referring to FIG. 3, excepting that the following points are different: Automatic phase control is performed in the phase detector in such a manner that the average phase of the reception signal from the I.-F. amplifier 4 and that of the voltage of the local oscillator 6 for phase detection are in quadrature and the reception signal for detector 10 is also in quadrature by means of a phase shifter 9 with the reception signal for the phase detector 10, with the result that the average phase of the reception signal in the detector 10 and that of the voltage from the local oscillator 6 for phase detection are either in coincidence or differ by 180 degrees. Consequently, the D.C. component in the detector output will become proportional to the magnitude of amplitude of the reception signal from the I.-F. amplifier 4. This operation will not be interfered with by noise in the same manner as the phase detector 5. Therefore, by controlling the gain of the intermediate-frequency amplifier 4 with the D.C. output, the reception signal voltage can be maintained substantially constant without being affected by noise even in cases where the noise is much larger than the signal in the output of the intermediate-frequency amplifier 4 at an extremely weak electric field strength.

In the absence of the reception signal, the D.C. output of the detector can be reduced to zero. This can be introduced into the monitoring circuit 11 to discriminate whether or not the reception signal is present, thereby performing the monitoring of whether the radio circuit is alive or not.

As has been fully described, this invention enables the frequency deviation in the reception input signal to be taken sufficiently large—that is, the channel signal-to-noise ratio to be fully favorable when the reception input power is large while said ratio has no possibility of being rapidly deteriorated even if the reception input power becomes extremely weak, with the result that reliable communication with an optimum value of the signal-to-noise ratio can be performed at an extremely weak electric field strength.

Therefore, the effect of this invention is of great practical importance.

What is claimed is:

1. A frequency modulation receiver in which the signal-to-noise ratio is not deteriorated abruptly when the amplitude of noise or interference waves exceed the amplitude of the modulated carrier waves comprising: an input circuit for receiving carrier waves that have been frequency modulated by signal waves; means for obtaining from said received waves intermediate frequency waves having the same frequency deviation as that of the received waves; a local oscillator generating waves having an amplitude at least as great as the absolute sum of the noise and signal; a phase detector responsive to said intermediate frequency waves and waves from the local oscillator to recover said signal waves; means for applying said recovered signal waves to said local oscillator in negative feedback relation whereby the phase deviation between the local oscillator waves and the intermediate frequency waves is maintained proportional to the signal modulation while the departure from the quadrature phase relationship between the phase of the local oscillator waves and phase of the intermediate frequency waves is not greater than an angle of approximately ±90°.

2. A frequency modulation receiver in which the signal-to-noise ratio is not deteriorated abruptly when the amplitude of noise or interference waves exceed the amplitude of the modulated carrier waves comprising: an input circuit for receiving carrier waves which have been frequency modulated by signal waves: two local oscillators; a mixer circuit responsive to said received waves and waves from one of said local oscillators to produce frequency modulated waves of an intermediate frequency; a phase detector to recover said signal waves, said phase detector being responsive to said waves of intermediate frequency and to waves from the other of said local oscillators, the amplitude of the waves generated by said other local oscillator having an amplitude at least as great as the absolute sum of the noise and signal; and means for applying said recovered signal waves to one of said local oscillators in negative feedback relation whereby the phase deviation between said one of said local oscillator waves and the intermediate frequency waves is maintained proportional to the signal modulation while the departure from the quadrature phase relationship between the phase of the local oscillator waves and phase of the intermediate frequency waves is not greater than an angle of approximately ±90°.

3. A frequency modulation receiver in accordance with claim 2 comprising phasing means for maintaining the average phase difference between the phase of the intermediate frequency waves and that of the output waves of one of said local oscillators equal to an integral multiple of 180°, means for detecting the amplitude variation of the voltage resulting from said phase difference and means responsive to said voltage amplitude variation to maintain substantially constant the output of said intermediate frequency modulated waves.

References Cited in the file of this patent

UNITED STATES PATENTS

| | | |
|---|---|---|
| 2,075,503 | Chaffee | Mar. 30, 1937 |
| 2,332,540 | Travis | Oct. 26, 1943 |
| 2,494,795 | Bradley | Jan. 17, 1950 |
| 2,678,386 | Bradley | May 11, 1954 |
| 2,871,349 | Shapiro | Jan. 27, 1959 |
| 2,911,528 | McRae | Nov. 3, 1959 |
| 2,930,892 | Palmer | Mar. 29, 1960 |

OTHER REFERENCES

Article, "Application of the Autosynchronized Oscillator to Frequency Demodulation" by Woodyard in Proceeding of the IRE, May 1937, pages 612–619.